United States Patent [19]

Schlosser

[11] Patent Number: 4,941,817
[45] Date of Patent: Jul. 17, 1990

[54] IGNITOR HOUSING FOR BARBECUE GRILL

[75] Inventor: Erich J. Schlosser, Barrington, Ill.

[73] Assignee: Weber-Stephen Products Co., Palatine, Ill.

[21] Appl. No.: 392,838

[22] Filed: Aug. 11, 1989

[51] Int. Cl.⁵ ............................................. F23Q 7/06
[52] U.S. Cl. ..................................... 431/263; 431/264; 126/41 R
[58] Field of Search ............... 126/41 R, 39 BA, 39 R; 431/263, 262, 264, 265, 266, 191; 317/96

[56] References Cited

U.S. PATENT DOCUMENTS

| | | | |
|---|---|---|---|
| 3,449,638 | 6/1969 | Beesch | 431/264 |
| 4,035,136 | 7/1977 | Howatt et al. | 431/263 |
| 4,266,930 | 5/1981 | Leonard | 431/263 |
| 4,288,210 | 9/1981 | Leonard et al. | 431/263 |
| 4,381,758 | 5/1983 | Svekis et al. | 431/263 |
| 4,386,385 | 5/1983 | Hamilton | 431/263 |
| 4,582,475 | 4/1986 | Hoppie | 431/264 |

Primary Examiner—James C. Yeung
Attorney, Agent, or Firm—Wallenstein, Wagner & Hattis, Ltd.

[57] ABSTRACT

An ignitor apparatus for a gas barbecue grill including a ground-forming housing (20) a chamber (22) that is inside the firebox of a barbecue grill and substantially encloses an electrode (24) opening towards the gas burner so that it captures gas from the burner and forms a combustible mixture. The housing has connector tabs (40, 42) for connection to the housing and has a friction-gripping arm (48) for securing the electrodes (24).

8 Claims, 1 Drawing Sheet

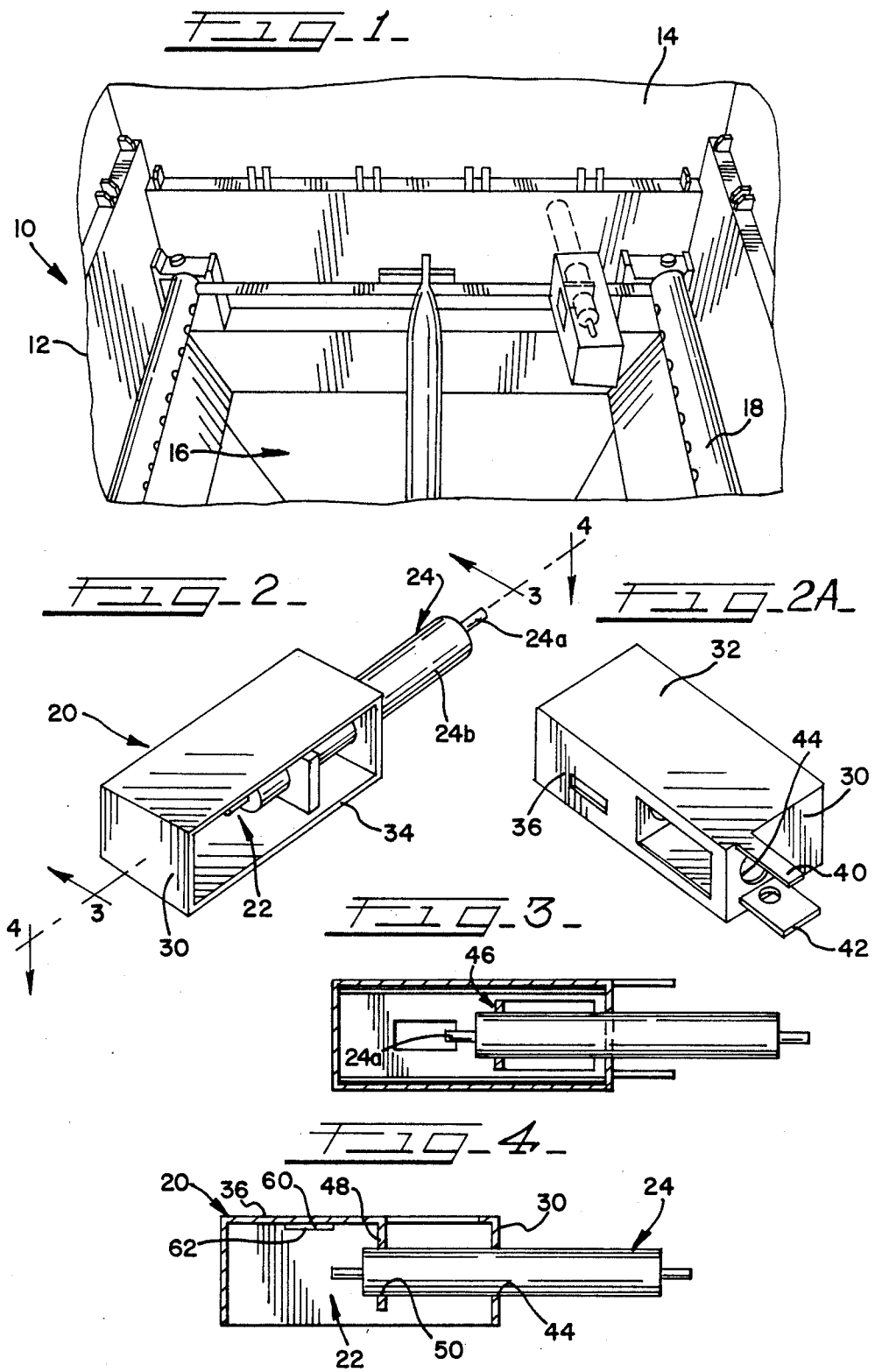

IGNITOR HOUSING FOR BARBECUE GRILL

DESCRIPTION

Technical Field

This invention relates generally to units for gas burners, and more particularly to a mechanism for enclosing the ignition unit.

BACKGROUND OF THE INVENTION

The use of outdoor cooking devices and more particularly barbecue grills has become increasingly more popular in recent years. Generally, the heat source for barbecue grills is either charcoal or gas.

In efforts to optimize the convenience for gas barbecue grills, many of these types of units incorporate an ignitor mechanism to eliminate the need for matches which can become dangerous since a gas build-up may occur within the grill before the gas is ignited.

Recently, the Assignee of the present invention has engineered a new gas charcoal grill that eliminates the need for the conventional lava rock that is customarily supported above the gas burners to absorb the heat from the combustion of the gases. This gas grill is disclosed in U.S. Pat. No. 4,677,964, incorporated herein by reference, and includes a novel gas burner arrangement consisting of two or three gas burner tubes all of which can be ignited from a single ignitor unit. In this patent, the ignitor unit is supported in an opening in a housing wall and includes an exposed electrode enclosed in a ceramic non-conductor and is positioned directly adjacent one of the burner tubes which forms the ground so that the gas emanating from the burner tubes is ignited by the spark produced between the electrode and the burner.

The electrode is supported on a bracket and extends through an opening in the housing wall, being secured by a fastener which has a ground lead connected thereto. This unit also incorporates a remotely controlled ignitor button which is conveniently located on the control console which also houses the control knobs that control the flow of gas to the respective burner tubes. The ignitor button has two leads respectively connected to the ground tab and the electrode. The proper gap between the electrode and the burner tube is adjusted by bending the electrode.

There are several disadvantages to ignitor units of the type disclosed in the above patent. A significant disadvantage is encountered during cleaning of the firebox, and grill. Oftentimes during cleaning, the exposed electrode of the ignitor unit is bent out of alignment during the removal and replacement of the grill components and the electrode is no longer positioned to produce the necessary spark in close proximity to the gas burner. Moreover, the burner assemblies are usually loosely mounted in the grill housing and thus it is difficult to maintain the same position between the burner tube (ground) and the electrode. Thus, the electrode must be bent to produce the desired gap each time the burner tube is moved. Consequently, this inhibits the ignition of the gas.

Another disadvantage is the fouling of the unit from grease drippings and other deposits incident to barbecuing. Such deposits prevent the piezoelectric member from sparking when activated.

Thus, there remains a need for a simple safeguard that protects the ignitor unit at all times.

SUMMARY OF THE INVENTION

According to the present invention, an ignitor apparatus which includes a ceramic electrode, is enclosed in a chamber to overcome the above problems without impairing the convenience of using the ignitor apparatus. The ignitor unit and its associated actuating mechanism are designed as a retrofit unit which can be installed as a replacement for the ignitor without any modification of the grill of the type disclosed in the above patent.

The ceramic electrode is mounted in a housing that defines a chamber inside the firebox in close proximity to the gas burner. The chamber defines a ground for the electrode and has a opening in close proximity to the gas burner such that, when the gas is released from the gas burner, the chamber captures some of the gas and mixes it with air and forms a combustible mixture. The housing has tab means which are used to secure the housing to the firebox and provide a connection for a ground lead. The electrode is activated from a remote button that, when activated, produces a spark between the electrode and grounded chamber, thus, igniting the gas. The chamber is formed with a rectangular configuration that substantially encloses the exposed electrodes of the ignitor and defines an ignition chamber open toward a burner tube to receive gases which are ignited in the chamber. In addition, the chamber provides an effective shield from grease and other drippings.

BRIEF DESCRIPTION OF DRAWINGS

FIG. 1 is a partial perspective view of the firebox of a barbecue grill, showing the improved ignitor assembly;

FIG. 2 is a perspective view of the ignitor apparatus enclosed in the chamber;

FIG. 2A is a perspective view of the housing with the electrode;

FIG. 3 is a cross-sectional perspective front view taken along line 3—3; and,

FIG. 4 is a cross-sectional view of taken along line 4—4 of FIG. 2.

DETAILED DESCRIPTION

While this invention is susceptible of embodiment in many different forms, there is shown in the drawings and will herein be described in detail a preferred embodiment of the invention. The present disclosure is to be considered as an exemplification of the principles of the invention and is not intended to limit the broad aspect of the invention to embodiment illustrated.

FIG. 1 illustrates in perspective a portion of a barbecue grill 10 presently being commercially marketed and is more thoroughly described in U.S. Pat. No. 4,302,181, which is incorporated herein by reference. Grill 10 is defined by two vertical side walls 12 and vertical end wall 14 that define and internal chamber 16, which might be referred to as a firebox that has a plurality of burner tubes 18 therein.

According to the present invention, a housing 20 defines a chamber 22 which substantially encloses an electrode 24.

The chamber 22 captures gas from one of the burners 18 forming a combustible mixture with air when the ignitor apparatus is activated causing a spark, the gas is ignited.

FIGS. 2 and 2A illustrate the electrode 24 location and support inside the housing 20 that is defined by a plurality of walls that form a generally rectangular chamber. The walls of the chamber protects the electrode from falling grease, and other material that may foul the electrode 24 and prevent contact by external elements.

The specific details of the housing are shown in FIGS. 2 and 2A and include a pair of end walls 30, a top wall 32, a bottom wall 34 and one side wall 36, with the opposite side being open towards the gas burner 18.

According to the invention, the housing 20 not only substantially encloses and supports the electrode 24, but also defines a ground for the positive terminal that is part of the electrode 24. The electrode 24 consists of an electrode element 24a supported in a ceramic non-conductive sleeve 24b, which in turn is supported on the housing 20, as will be described later.

The housing 20 incorporates a tab means in the form of first and second tabs 40 and 42 that extend from one end wall 30 and have a generally circular opening 44 located therein. The circular opening receives the electrode 24, and the housing 20 also has a support means 46 located therein. As shown in FIGS. 3 and 4, the support means 46 consists of a resilient arm 48 that is deformed from side wall 36 and extends generally perpendicular thereto.

The resilient arm 48 has an opening 50 that is aligned with opening 44 in end wall 30. Since the housing is formed of a spring metal material, the resilient arm can easily be bent to any angle with respect to the wall 36. Thus, the resilient arm 48 defines a friction-gripping means for gripping the electrode 24 in a fixed position in the housing 20, more specifically the chamber 22.

As indicated above, the housing 20 is formed of metal and thus defines a ground for the negative terminal for creating a spark between electrode 24a and the housing 20. For this purpose, the tabs 40 and 42 extend through openings (not shown) in the firebox, particularly the end wall 14, and the tabs can then be bent to define the securing means for securing the housing 20 to the end wall 14. Also, one of the tab means, such as tab 40, can be configured to receive a ground lead leading from an actuator button, while the electrode has a second lead leading from the actuator button, which, when depressed, will produce the spark between the housing 20 and the electrode 24b.

In order to provide a surface for producing a spark, the side wall 36 of the housing has a tab 60 deformed therefrom which defines an edge 62 that is generally aligned with the free edge of the electrode 24b.

Thus, the electrode housing 20 provides a convenient mechanism which can easily be fabricated from a single sheet of metal to the configuration shown in FIG. 2A and the electrode 20, including its ceramic covering 24b, can be extended through the opening 44, which is preferably the same size as the ceramic sleeve 24a, and received into the opening 50 in the resilient arm 48.

After it has been assembled, the position of the electrode 24 can easily be changed merely by forcing the arm 48 truly perpendicular to the wall 36 so that the holes 50 and 44 are in exact alignment and the electrode can then be easily moved axially to the desired position. When the desired position is reached, the resilient arm 48 can be released and the spring in the metal forming the housing 20 will tend to reorient the arm 48 to provide a frictional grip for the electrode 24 within the housing 20.

One of the significant advantages of the present invention is the fact that the unit, including the push button actuator and its lead wires, can be formed as a complete unit for shipment and installation. Moreover, since the firebox that defines the chamber 16 already has an existing opening for receipt of the electrode identical to electrode 24 in its housing, along with mechanism for securing the bracket, the ignitor unit can easily be assembled without any modification of the existing gas grill assembly. In this respect, the tabs 40 and 42 can extend through the existing firebox opening and be bent substantially perpendicular to provide the securing means for the housing 20 within the grill 10. Thereafter, the lead wires from the actuator are frictionally attached to the tab 40 and the electrode 24a.

While the specific embodiments have been illustrated and described, numerous modifications come to mind without significantly departing from the spirit of the invention and the scope of protection is only limited by the scope of the accompanying claims.

I claim:

1. In a barbecue grill having a firebox with a gas burner and ignition means in said firebox for igniting gas supplied to said burner, the improvement comprising:
    said ignition means including an electrode and a housing partially enclosing said electrode and defining a ground contact;
    said housing having multiple walls that define a generally rectangular chamber having an opening proximate to said gas burner with said opening oriented with respect to the burner;
    first and second tabs formed integrally with said housing and received through opening means in said firebox and bent to secure said housing to said firebox; and,
    support means in said chamber frictionally engaging said electrode.

2. A barbecue grill as defined in claim 1, in which said housing has an opening receiving said electrode with said support means including a resilient arm extending from said housing and having an opening receiving said electrode.

3. A barbecue grill as defined in claim 2, wherein said resilient arm is deformed from a wall of the chamber and forms an angle generally perpendicular to the wall from which it is deformed.

4. In a barbecue grill having a firebox with a gas burner and ignition system means in said firebox for igniting gas supplied to said burner, the improvement of said ignition system means including:
    a generally rectangular housing defining a chamber formed by a plurality of walls, the chamber defining a ground and being proximate to a gas burner with an opening oriented with respect to the burner, an electrode supported in said chamber with actuating means connected to said electrode and housing; and,
    tab means on said housing defining connection means for said housing on said firebox.

5. A barbecue grill as defined in claim 4, in which said tab means includes first and second tabs with one of said tabs defining a connection for a ground lead.

6. A ignitor unit for a grill having a firebox with a gas burner therein, said ignitor unit including an electrode defining a positive terminal and a ground-forming housing supporting said electrode with said housing form an ignition chamber opening toward said gas burner, said housing having a resilient arm deformed therefrom extending into said chamber and retaining said electrode in said housing.

7. An ignitor unit as defined in claim 6, in which said housing has a deformed portion defining an edge cooperating with said electrode to produce said spark.

8. An ignitor unit as defined in claim 6, further including a connecting tab on said housing and an actuating member having first and second leads respectively connected to said tab and said electrode to define a closed circuit producing a spark between said electrode and said housing upon actuation thereof.

* * * * *